United States Patent [19]

Sandall

[11] Patent Number: 4,952,041

[45] Date of Patent: Aug. 28, 1990

[54] SCOPE WITH POWERED ZOOM

[76] Inventor: Vern R. Sandall, 113 S. Fort La., Layton, Utah 84041

[21] Appl. No.: 352,972

[22] Filed: May 17, 1989

[51] Int. Cl.$^5$ .................. G02B 7/10; G02B 23/16; G02B 23/00

[52] U.S. Cl. .................................. 350/560; 350/429

[58] Field of Search ..................... 350/560, 570, 429

[56] References Cited

U.S. PATENT DOCUMENTS

| | | | |
|---|---|---|---|
| 3,418,032 | 12/1988 | Kujiro | 350/429 |
| 3,506,330 | 4/1970 | Allen | 350/560 |
| 4,094,587 | 6/1978 | Besenmatter et al. | 350/423 |
| 4,472,033 | 9/1984 | Fukuhara et al. | 350/429 |
| 4,626,077 | 12/1986 | Yamamoto | 350/429 |
| 4,749,268 | 6/1988 | Moskovich et al. | 350/429 |
| 4,802,717 | 2/1989 | Kebo | 350/560 |
| 4,844,586 | 7/1989 | Suzuki et al. | 350/429 |

Primary Examiner—Jon W. Henry
Attorney, Agent, or Firm—Trask, Britt & Rossa

[57] ABSTRACT

A powered-zoom rifle scope is disclosed. The scope includes a body tube with an eyepiece mounted at an ocular end and an objective lens mounted at an objective end. A cylindrical zoom lens assembly is mounted at the objective end of the body tube and optically aligned with the scope. A cylindrical housing is positioned about the body tube at the objective end of the scope to encase the zoom lens assembly and to provide an annular space between the body tube and the housing. The zoom lens assembly has a ring-like zooming gear mounted proximate the objective lens of the scope. A miniaturized bidirectional motor and a plurality of batteries are mounted in the annular space with the motor mechanically linked with the zooming gear. A finger operable switch is mounted at the eyepiece of the scope and linked with the motor to allow the user to operate the zoom lens assembly while retaining a finger on the trigger of the firearm and the target image within the field of view of the scope.

17 Claims, 4 Drawing Sheets

SCOPE WITH POWERED ZOOM

BACKGROUND OF THE INVENTION

1. Field:

The present invention is directed toward a scope, notably a rifle scope, having a motor-powered zoom lens assembly.

2. State of the Art: A zoom lens assembly ("zoom") is a mechanically operable assembly of lenses that is typically associated with some other optical device to vary the magnification of the image provided by the device. Zoom lens assemblies allow a user to "zoom," or quickly and continuously vary the magnification of the device between a particular minimum and maximum magnification. While retaining the image in the eyepiece of the optical device, the user can zoom in on the image at a relatively higher power or zoom out to provide a lower power and a wider field of vision. Zoom lens assemblies are commonly used in association with video, movie, and snapshot cameras. On such devices, the zoom lens assembly is often motor powered.

Certain binoculars are available which include a powered zoom lens assembly. These binoculars include an electronic switch or button located within easy reach of the user's fingers while holding the binoculars to the user's eyes. Such zooms allow the viewer to retain the selected image in the field of view while zooming to the desired magnification. With such binoculars, the motor, batteries, and other elements of the zoom assembly are mounted above and between the main optical elements.

Certain firearm scopes come equipped with a variable magnification lens assembly located at the eyepiece. To vary the magnification, the shooter is required to remove the firearm from the shooting position and rotate the eyepiece to the desired magnification. Such movement results in the shooter losing the target in the field of view of the scope. In addition, the target may sense the movement and the shooting opportunity may be lost.

Once the shooter has located his target within the field of view of the scope, it would in many instances be helpful for the shooter to zoom in to the target without removing the target from the field of view. The shooter may wish to verify that he is shooting an animal of the proper sex or that the animal has certain characteristics, such as size of rack, to make it a desirable trophy. In a military or police sniper setting, the shooter may want to positively identify his selected target.

In a firearm scope setting, extraneous mountings of motors or lens assemblies such as used with binoculars would be disadvantageous or unacceptable. Shooters are unaccustomed to having anything protruding from the side or the top of a scope. It is preferable for the rifle and scope to be as compact and lightweight as possible. Any protrusions from a scope would create additional possibility for the scope to be struck or damaged. In addition, many shooters may find such protrusions aesthetically unacceptable.

There remains a need for a powered zoom lens assembly which is mounted to be optically aligned with the main body of the scope and to present an outer appearance generally consistent with the shape of and aligned with the scope. Such an assembly would preferably be lightweight and powered by a motor and power supply in a compact assembly mounted to and conforming to the shape of the scope. Additionally, such an assembly would include a switching mechanism easily operable by the user without the necessity of the shooter losing the target image in the field of view.

SUMMARY OF THE INVENTION

The present invention provides a scope having a powered zoom (powered zoom scope) which comprises an elongate tube and an eyepiece lens mounted at an ocular end of the tube. An objective lens is mounted to an objective end of the tube. A zoom lens assembly is mounted at the objective end and aligned with the body tube. A housing is mounted at the objective end, encasing the zoom lens assembly, and aligned with the tube. A drive means is mounted within the housing for operation of the zoom lens assembly. A switch means is linked with the drive means for selective zooming of the zoom lens assembly.

The term "scope" as used herein refers to an optical device designed for magnifying the image of distant objects, such as astronomical or terrestrial telescopes. Powered zoom scopes of the invention are advantageously applied to scopes used in a field environment, such as "spotting scopes," and more particularly to firearm scopes, such as those used on hunting rifles and on police or military sniper firearms.

The zoom is powered by a drive means, such as a motor and a battery pack, mounted to the scope and linked with the zoom lens assembly to continuously drive it between its minimum and maximum magnifications. Preferably, a switch means is mounted at the ocular end of the body tube to allow the shooter to operate the zoom while keeping the firearm in a shooting position and retaining the target image with the field of view of the scope.

In a preferred embodiment, the housing surrounds the body tube to provide an annular space between the housing and the body tube. The drive means may then be comprised of a miniaturized motor and a plurality of batteries mounted in the annular space.

DETAILED DESCRIPTION OF THE ILLUSTRATED EMBODIMENT

Figure 1:
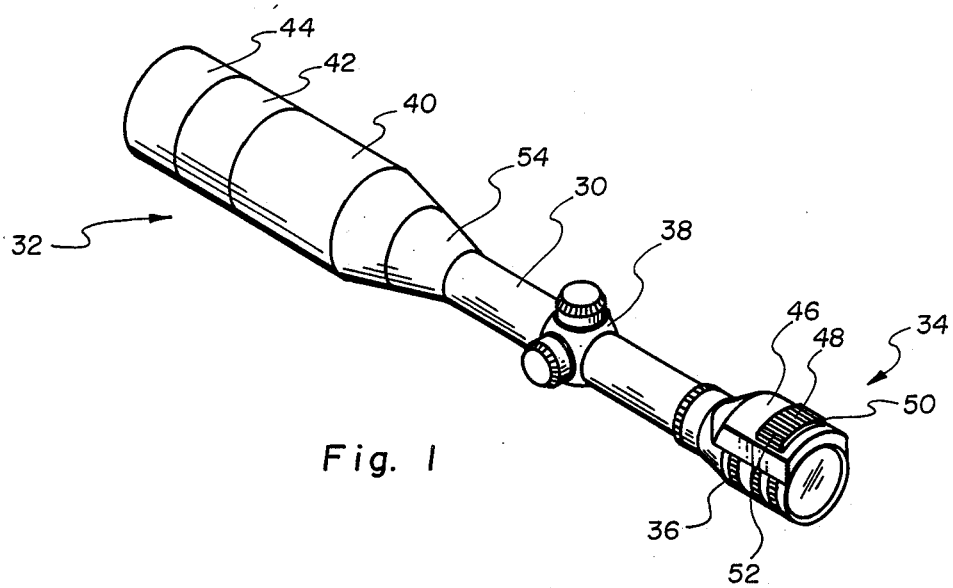
FIG. 1 is a perspective view of a powered zoom scope of the invention.

Referring to FIG. 1, the illustrated powered zoom scope includes a main body tube 30 having an objective end generally indicated at 32 and an ocular end generally indicated at 34. An eyepiece 36 is mounted at the ocular end 34 of tube 30. A cross hair assembly 38 is mounted to tube 30 to be between ocular end 34 and objective end 32. A motor and battery housing 40 is mounted about tube 30 at objective end 32. A zoom lens assembly housing 42 is mounted as shown at objective end 32 to extend beyond housing 40. A focusing lens assembly 44 is mounted to extend beyond housing 42 also at objective end 32. A switch assembly 46 with button 48 is mounted to eyepiece 36 as shown.

Body tube 30 is a standard one inch outside diameter tube configured to be mounted upon a rifle. When the shooter locates the target within the field of view, as viewed through eyepiece 36, the shooter depresses either the right side 50 or the left side 52 of button 48 to either increase to decrease the magnification of the scope, respectively. This zooming process can be conveniently accomplished with the thumb while keeping the trigger finger on the trigger. Thus, the zooming process can be completed without removing the target from the field of view and without making extraneous movement which may alert the target to the presence of the shooter.

Figure 4:
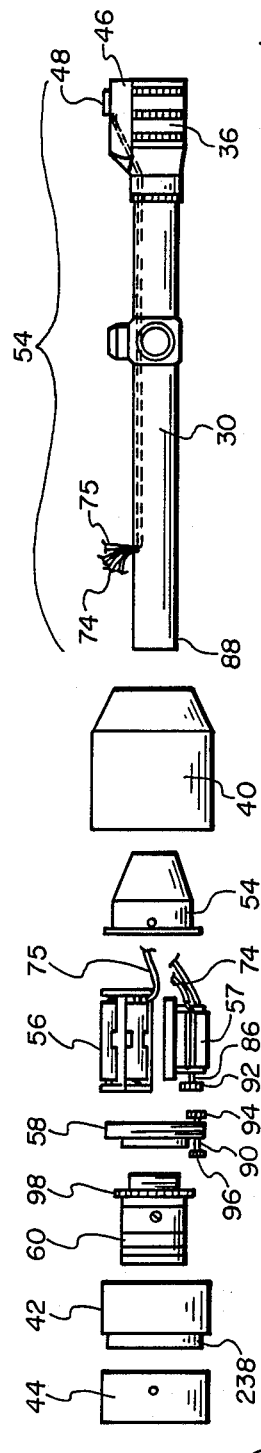
FIG. 4 is an exploded view of a powered zoom scope of the invention.

Referring to FIG. 4, a powered zoom scope of the invention includes a scope 54 having tube 30 and eyepiece 36, previously described, motor and battery housing 40, a mounting member 54, battery pack 56, motor 57, transfer gear collar 58, zoom lens assembly 60, housing 42, and housing 44. Both housings 42 and 44 constitute a housing for zoom lens assembly 60. Housings 40, 42 and 44 all constitute a housing for a drive means, here disclosed as motor 57 and battery pack 56, and for the zoom lens assembly 60.

Figure 2:
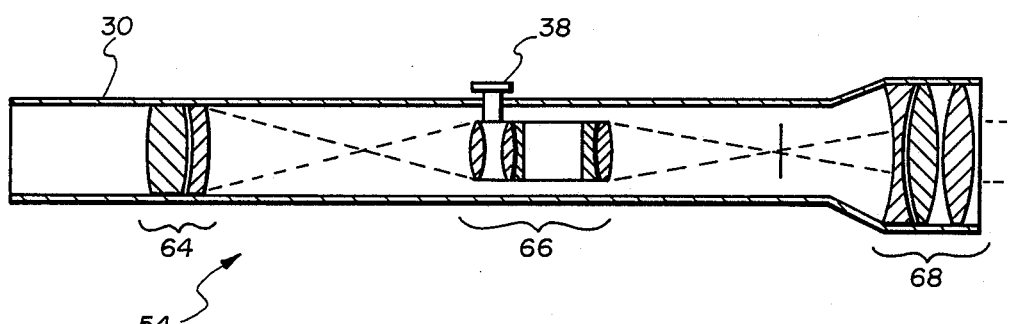
FIG. 2 is a side sectional view of a scope of the invention.

Referring to FIG. 2, scope 54 is shown disassociated from switch 46 and from any elements of the zoom lens assembly or driving mechanism. Scope 54 is shown to be a standard fixed power scope. A scope which has been found to be useful is a 4 power fixed magnification scope focused at infinity. The construction of rifle scopes is illustrated in U.S. Pat. Nos. 3,510,192 (Akin, Jr. et al.); 3,918,791 (Perry); 3,612,646 (Walker); and 4,497,548 (Burris). The disclosure of each of these patents is incorporated herein by reference.

Scope 54 includes three main optical components, objective lens assembly 64, an erector lens assembly 66, and an ocular lens assembly or eyepiece 68. Since scope 54 is intended to be used as a rifle scope, it is necessarily a terrestrial scope, which views the target right side up, as opposed to an astronomical scope, which often presents the image upside down. The righting of the image occurs at the erector lens assembly 66. Also, a typical cross hair assembly 38 is in association with the erector lens assembly to present a pair of cross hairs to aid the shooter in accurately aiming at the target. The construction of such cross hair assemblies is also well known.

In scope 54, the objective lens assembly has the same diameter as the interior of tube 30. Tube 30 has a one inch outside diameter with a wall thickness of approximately 0.050 inch. The diameter of objective lens assembly 64 is therefore approximately 0.9 inches or approximately 23 millimeters. The entire scope shown in FIG. 2 is approximately 9.8 inches in length.

Figure 3:
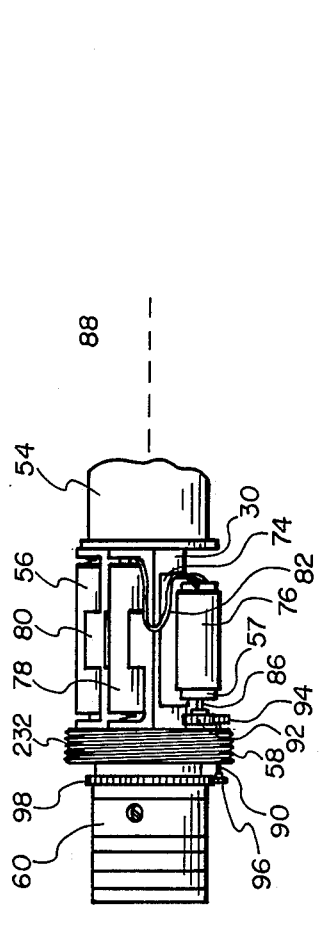
FIG. 3 is a side partial cut-away view of a motor and zoom lens assembly of the invention.

The power and drive assembly for the zoom lens is described in reference to FIGS. 3 and 4. A miniaturized bidirectional motor 57 is mounted to tube 30 by means of a semi-cylindrical plate 74 having a clip 76 which encases motor 57 about its circumference. Plate 74 may be connected to tube 30 by any convenient means, for example, by being cemented or attached with machine screws. A motor which has been found to be useful is a DC micromotor series 1212 with a gear head reduction of 529 to 1, manufactured by Micro Mo Electronics, Inc. of St. Petersburg, Fla. Motor 57 is 12 millimeters long and has a 12 millimeter diameter. Motor 57 requires a 6 volt DC power supply.

Included in battery pack 56 are a set of four size AA 1.5 volt batteries, of which battery 78 is typical. Batteries 78 are mounted in clips of which clip 80 is typical about the circumference of tube 30, as shown. Batteries 78 are linked in series to provide a total of 6 volts to motor 57. As shown, motor 57 includes a shaft 86 which is aligned with the longitudinal axis 88 of body tube 30.

Transfer gear assembly 58 attaches to the extreme end 88 (FIG. 4) of tube 30 by any convenient means, such as set screws. Assembly 58 connects the main body tube 30 to the remainder of the zoom lens assembly and serves as a connection for housings 40 and 42 as described infra. A shaft 90 rotates within a smooth bore formed in collar 58. Collar 58 is preferably formed of a lightweight material such as aluminum.

Attached to shaft 86 is a pinion gear 92 which has a diameter of approximately 7.5 millimeters and includes 20 gear teeth. Gear 92 associates with a smaller gear 94 attached to shaft 90 as shown. Gear 94 is approximately 4.5 millimeters in diameter and has 12 gear teeth. Attached to the other end of shaft 90 is gear 96, which is approximately 3.5 millimeters in diameter and has eight teeth. Gear 96 engages with zooming gear 98 of zoom lens assembly 60, as shown. Zooming gear 98 is approximately 4.2 cm in diameter and has 84 teeth. Gear 98 was originally designed to be driven by a worm drive gear with its axis mounted transverse to axis 88. Therefore, its gears are slightly angled to accommodate a worm drive gear. To accommodate this angling of the gear teeth of gear 98, the teeth of gear 96 have a narrow profile to effectively intermesh in a pinion gear relationship with the teeth of gear 98.

Motor 57 is bidirectional. As shown, motor 57 is linked mechanically through gears 92, 94, 96, and 98 to zoom lens assembly 60. When appropriately switched by means of switch 46, motor 57 effectively powers zooming gear 98 in either rotational direction to cause zoom lens assembly 60 to zoom in or out as desired.

Abutting against batteries 78 is housing 54, as shown. Housing 54 is attached to tube 30 by means of set screws serves to hold battery pack 56 in place between housing 54 and collar 58. Battery pack 56 may be attached to tube 30 by any convenient means, for example, by means of cement or set screws. Battery pack 56 is formed preferably of plastic and to have an inner cylindrical shape to effectively associate and connect to tube 30. It also has appropriate terminal connections to place batteries 78 in series to provide the 6 volt potential described.

Figure 5:
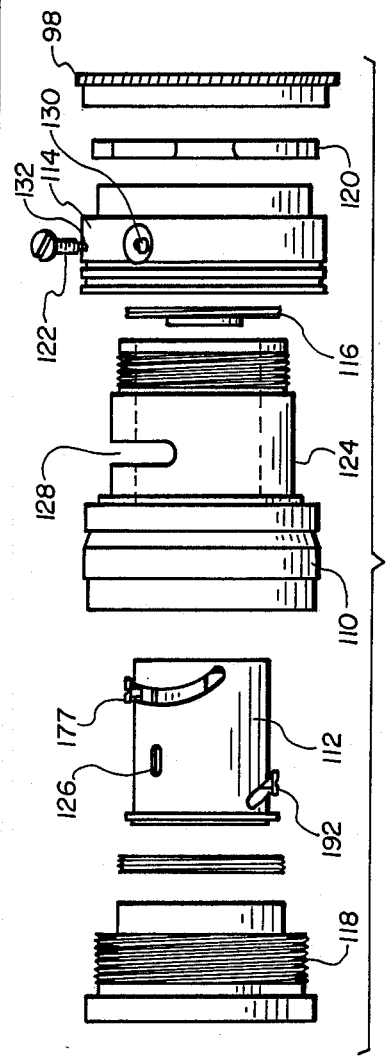
FIG. 5 is an exploded view of a zoom lens assembly of the invention.
Figure 6:
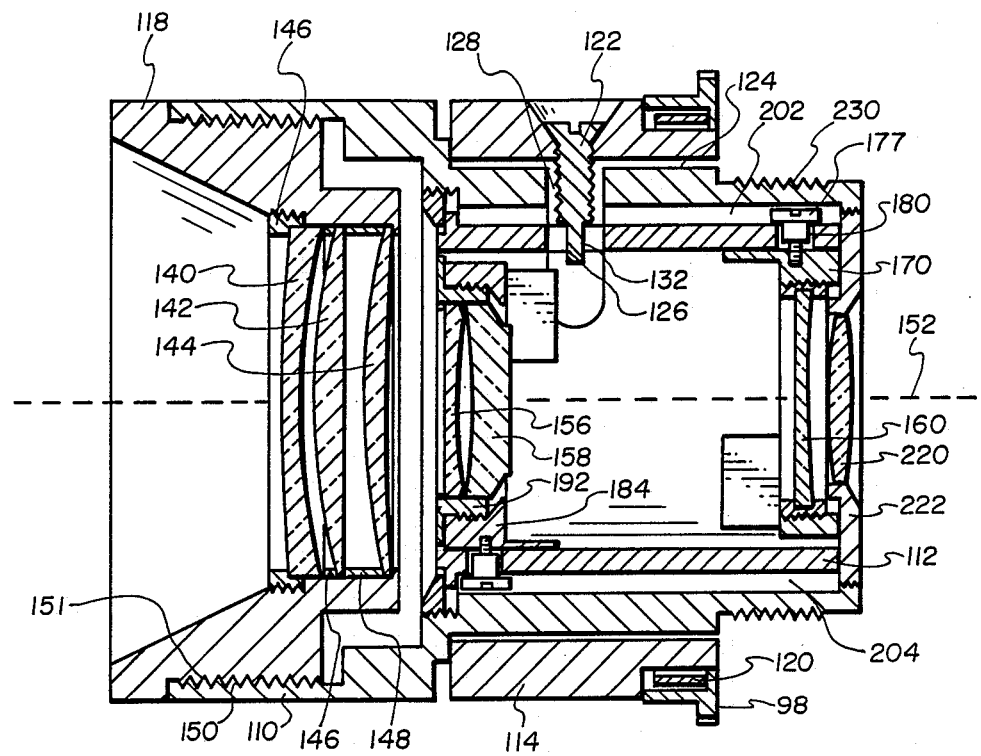
FIG. 6 is a side sectional view of a zoom lens assembly of the invention.

Zoom lens assembly 60 is now described in reference to FIGS. 5, 6, 7, 8, 9, and 10. Zoom lens 60 is intended to illustrate a typical zoom lens assembly which may be purchased commercially as a unit. Such zoom lens assemblies typically have a ring-like zooming gear such as zooming gear 98. The gearing between the motor such as motor 57 and this zooming gear can be adapted to provide an appropriate gearing reduction and zooming time. The illustrated zooming assembly 60 is a Cinetor reflex zoom lens, with an aperture or f number ratio of 1:1.8 and a focal length ranging between 9.5 and 32 millimeters. This zoom lens assembly was designed for an 8 mm movie camera manufactured by Viceroy, and is no longer available commercially. Another zoom lens assembly which would be adaptable for use is an Elmo Zoom Lens, manufactured by Elmo Co., Ltd. of Japan, model number 324225, having an aperture or f number ratio of 1:1.8 and a focal length ranging between 9 and 36 mm. The zooming gear on this lens is a crown gear. An appropriate gearing may be constructed to link the crown gear to motor 57, or, more advantageously, the crown gear may be replaced by a ring gear, such as ring gear 98 (FIG. 6). Other similar zoom lens assemblies are available from snapshot and video camera manufacturers, notably, for example, Minolta Corporation. Zoom lens assemblies are illustrated in U.S. Pat. Nos. 3,259,044 (McMillin et al.); 3,633,483 (Nagashima); and 3,850,507 (Uesugi). The disclosures of each of these patents are incorporated herein by reference.

Referring to FIG. 5, zoom lens assembly 60 includes a main assembly housing 110, a rotating zoom member 112, a semi-rotating collar 114, fixed lens element 116, focusing lens element 118, zooming gear 98, spring clutch 120, and key 122.

Semi-rotating collar 114 fits snugly and rotatingly about shoulder 124 formed on housing 110. Rotating zoom member 112 slides into the left end of housing 110 in such a way that slot 126 formed in member 112 is in registration with semi-circular slot 128 formed in shoulder 124. Key 122 is a machine screw having threads to threadably associate with bore 130 formed in collar 114. Key 122 extends through slot 128 so that shoulder 132 formed on key 122 passes into slot 126 of rotating member 112. The association between various elements of the zoom lens assembly is described more completely infra.

Referring to FIG. 6, focusing lens assembly 118 includes lens elements 140, 142, and 144, as shown. A spacer ring 146 spaces lens 140 from lens 142, as shown, and a larger spacer ring 148 spaces lens 142 from lens 144, as shown. A lock ring 146 holds lenses 140, 142, and 144 in their position within focusing lens assembly 118. Focusing assembly 118 associates with zoom housing 110 by means of interlocking threads 150 and 151, as shown. The zoom lens assembly 60 is focused at various distances by means of rotating focusing lens assembly 118 with respect to zoom housing 110 about axis 152, which is the optical axis of the zoom lens assembly. In FIG. 6, the assembly is shown focused at infinity. By rotating assembly 118 counterclockwise approximately 90° from the position shown in FIG. 6, the assembly is focused at a distance of approximately 1.5 meters, which is its approximate minimum focusing distance.

Rotatably mounted within zoom housing 110 is rotating zoom member 112. Associating with member 112 are lens elements 156, 158, and 160. The mounting and association of lens elements 156, 158, and 160 is more clearly shown in reference to FIGS. 8, 9, and 10.

Figure 8:
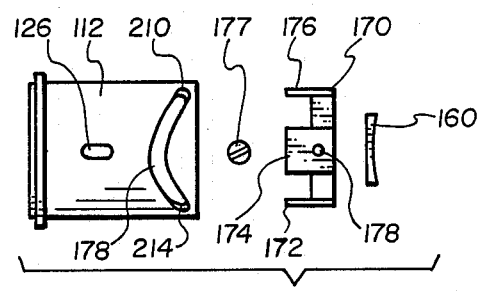
FIG. 8 is an exploded view of rotating zoom member 112 of FIG. 6 with rear sliding lens element 170 of FIG. 6.
Figure 10:
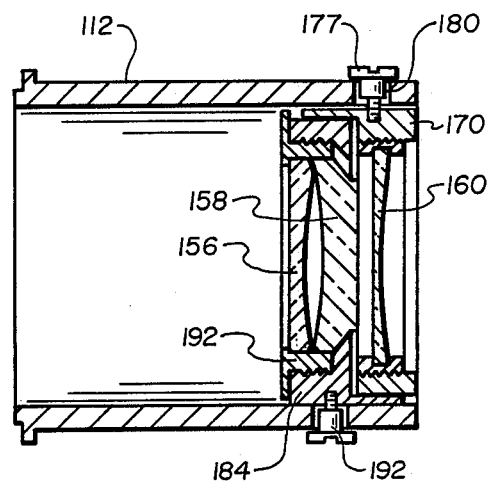
FIG. 10 is a side sectional view of a rotating lens element assembly in its maximum magnification orientation.

Referring to FIG. 8, lens element 160 is mounted within slide 170, which has three ribs 172, 174, and 176. Slide 170 is formed to have a generally cylindrical outer shape to fit within the cylindrical inner shape of rotating member 112. Slide 170 is configured to either rotate or slide longitudinally within member 112. After inserting slide 170 into the interior of member 112, a machine screw or key 177 is inserted into slot 178 threaded into threaded hole 178 in slide 170 to firmly connect to slide 170. Screw 177 extends above the outer surface of rotating member 112, as shown in FIGS. 6 and 10. Screw 177 has a shoulder portion 180 which is configured to freely move within slot 178 to cause slide 170 to move longitudinally and rotatingly within member 112 as determined by the shape of slot 178.

Figure 9:
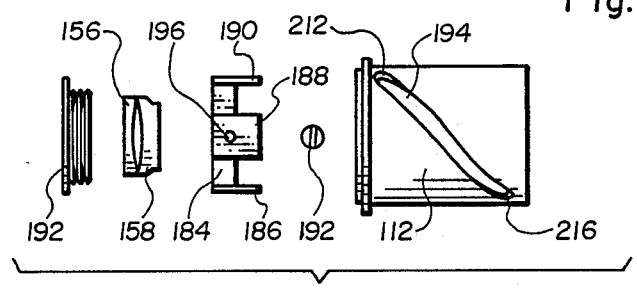
FIG. 9 is rotating zoom member 112 of FIG. 6 with front sliding lens element 184 of FIG. 6.

Referring to FIG. 9, lens element 156 and 158 are mounted to slide 184, which is similar to slide 170. Slide 184 has three ribs 186, 188, and 190, and also has a generally cylindrical outer surface to register with the interior cylindrical surface of rotating member 112. A lock ring 192 holds lens elements 156 and 158 within slide 184 as shown in FIGS. 6 and 10. After placing slide 184 into the interior of rotating member 112, screw 192, which is identical to screw 177, is passed through slot 194 and into threaded hole 196. Screw or key 192 associates freely within slot 194 to cause slide 184 to move longitudinally and rotatingly within rotating member 112, as determined by the shape of slot 194.

Figure 7:
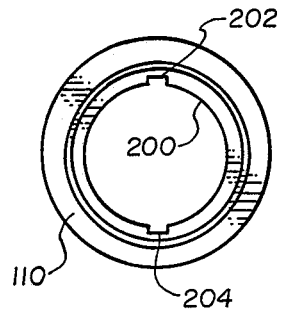
FIG. 7 is a end view of the zoom housing of FIG. 6.

Referring to FIG. 7, zoom member 110 is formed to have a cylindrical interior surface 200 which registers with the outside cylindrical surface of rotating member 112. Zoom housing 110 also has a pair of longitudinal lots 202 and 204 formed in interior surface 200. Slots 202 and 204 register with machine screws 192, respectively, to cause machine screws 177 and 192, and hence slides 170 and 184 to maintain a constant rotational alignment with respect to zoom housing 110 as rotating member 112 rotates within zoom housing 110. Slots 202 and 204 are spaced 180° away from each other within zoom housing 110 thus spacing screws 177 and 192 at this same relative angular orientation.

In FIG. 6, the zoom lens assembly 60 is shown in its minimum magnification orientation. In this position, screw 177 is in abutment with edge 210 (FIG. 8) of slot 178. Key 192 is in abutment with edge 212 of slot 194. FIG. 10 shows the lens elements associated with rotating member 112 in their maximum magnification orientation. In this position, key 177 is in abutment with edge 214 (FIG. 8) of slot 178 and key 192 is in abutment with edge 216 of slot 194. In the minimum magnification orientation, lens elements 156, 158 and 160 are in their closest relative position. In this configuration, ribs 172, 174, and 176 intermesh with ribs 186, 188 and 190 to allow elements 156, 158 and 160 to approach each other in their minimum relative position shown. In the minimum magnification orientation shown in FIG. 6, lens elements 156 and 158 are at their maximum distance from lens element 160. Slot 128 formed in zoom housing 110 and slots 178 and 194 formed in rotating member 112 each span approximately 150° of angular measurement about axis 152. The entire described zooming takes place within this amount of angular rotation.

Referring now again to FIG. 6, a fixed lens element 220 is attached by means of glue to a lock ring 222, which is in turn threadedly attached to zoom housing 110. Lens element 220 remains in a fixed position with respect to zoom housing 110.

Zooming gear 98 registers about collar 114, as shown. A spring clutch 120 formed of spring steel is fitted between zooming gear 98 and collar 114, as shown. When zooming gear 98 is rotated either clockwise or counterclockwise about axis 152, clutch 120 frictionally registers between zooming gear 98 and with collar 114 to cause collar 114 to also rotate. As described, key 122 associates with rotating member 112 to cause rotating member 112 to rotate in the same amount. As rotating member 112 rotates, slots 178 and 194 act as camming grooves which urge keys 177 and 192, respectively, and hence, sliding members 170 and 184 along their designed paths to cause the appropriate zooming of the assembly.

When key 122 reaches its maximum angular rotation within slot 128, zooming gear 98 slips, by means of clutch 120, about collar 114. This slip precludes motor 57 from being stopped abruptly and from being burned out by excessive torque loading. In use, motor 57 emits a slight humming noise as it rotates to cause the zooming of the lenses. However, when additional torque is exerted in the condition when zooming gear 98 slips upon collar 114, the hum of motor 57 changes to a lower pitch, thus indicating to the user that maximum zooming in either direction has been achieved.

Zoom lens assembly 60 connects to collar 58 at threads 230 which interlock with associating threads on the interior of collar 58. Housing 40 also includes a set of interior threads which interlock with threads 232 (see FIG. 3) to firmly position housing 40 in place surrounding motor 57 and battery pack 56. When housing 40 is in place, it provides a continuation of the cone shape presented by housing 54, as shown in FIG. 1. Housing 42 also connects by means of interior threads to threads 232 of collar 58 to present a smooth, cylindrical housing which covers both the motor and battery pack assembly and the main portion of the zoom lens assembly 60.

Housing 44 attaches by means of set screws to focusing lens housing 118. Focus adjustments can be made rotating housing 44 clockwise or counterclockwise to effect a focus of the entire scope. Housing 44 slidingly and rotatably registers about a shoulder 238 (FIG. 4) formed on housing 42, so that no gap is presented when housing 44 is moved longitudinally along axis 152 by means of its rotation relative to housing 42. Housings 40, 42, and 44 constitute a single housing for the drive means or power unit and the zoom lens assembly to present a smooth, cylindrical outer shape which is aesthetically pleasing and which precludes any portion of the power assembly or the zoom lens assembly from being struck or contacted, particularly, for example, in a field or hunting environment.

Referring to FIG. 4, motor 57 connects to switch 46 by means of wires 74. Battery pack 56 connects to switch 46 by means of wires 75. Switch 46 has three positions. In its undepressed or neutral position, no power is supplied from battery pack 56 to motor 57. When the right side of button 48 is depressed as viewed by a shooter, in other words, from the position looking into eyepiece 36, motor 57 and hence zooming gear 98 are caused to rotate counterclockwise as viewed from this position, to zoom the zoom lens assembly to its minimum magnification position. When the sound of motor 57 decreases in pitch, the user is alerted to cease depressing button 48, since the zoom scope is then in its minimum magnification position. To then cause the scope to move toward its maximum magnification condition, the user depresses the left side (as viewed from the objective 36) of button 48 to cause motor 57 and zooming gear 98 to rotate clockwise as viewed from eyepiece 36. Again, when the sound of the motor lowers in pitch, the user realizes that the maximum magnification position has been reached and again releases button 48.

The body tube 30, zoom lens assembly 60, and the housing provided by housing members 40, 42 and 44, are all generally aligned. They each have collinear longitudinal axes. The outer shape and appearance of the illustrated scope (see FIG. 1) is consistent with the shape of firearm scopes generally. Certain rifle scopes have cylindrical light shades extending beyond the objective lens which are similar in appearance to the outer appearance of housings 40, 42 and 44.

The illustrated powered zoom rifle scope presents a rifle scope having a zooming capability which can be operated by the user conveniently while retaining the target in the field of view and without making any extraneous movement which might frighten or alert the target to the presence of the shooter. The outside of the scope presents a smooth, generally cylindrical exterior without any extraneous protrusions which might get struck in a shooting or field environment. The exterior of the scope is altered only slightly from a standard rifle scope, which does not have the powered zoom capability. The zoom lens assembly is lightweight and will not significantly change the weight or balance of the firearm. With the motor, power, and gearing illustrated, zooming is accomplished between the minimum and maximum magnification in approximately 3.3 seconds. A selected amount of zooming can be achieved at any point between minimum and maximum magnification by the user simply releasing button 48.

Reference herein to details of the illustrated embodiment is not intended to limit the scope of the appended claims, which themselves recite those features regarded as important to the invention.

I claim:

1. A powered zoom scope, comprising:
   an elongate body tube constituting means for attachment to a rifle mount;
   an eyepiece mounted at an ocular end of said body tube;
   an objective lens mounted at an objective end of said body tube;
   an erector lens mounted within said body tube and having crosshairs therein;
   a zoom lens assembly mounted at said objective end and aligned with said body tube, wherein said zoom lens assembly includes a ring-like zooming gear mechanically linked with said motor;
   a generally tubular housing mounted at said objective end, encasing said zoom lens assembly, and aligned on a collinear longitudinal axis with said body tube;
   a drive means mounted within said housing for powering said zoom lens assembly, said drive means including a miniaturized motor mounted in said housing and mechanically linked with said zoom lens assembly; and
   switch means mounted at said ocular end of said body tube and linked with said drive means for selective operation of said zoom lens assembly.

2. A powered zoom scope according to claim 1, wherein said drive means includes at least one battery mounted within said housing.

3. A powered zoom firearm scope which may be attached to a rifle mount and thereby to a rifle, comprising:
   an elongate body tube constituting a means for attachment to a rifle mount;
   an eyepiece mounted at an ocular end of said body tube;
   an objective lens mounted at an objective end of said body tube;
   an erector lens mounted within said body tube and having crosshairs therein;
   a generally cylindrical zoom lens assembly mounted at said objective end to be aligned with said body tube and having a zooming gear mounted proximate said objective lens system;

a cylindrical housing mounted at said objective end surrounding said body tube and having a larger diameter than said body tube;

a miniaturized motor mounted within said housing and mechanically linked with said zooming gear;

a power supply mounted in said housing and linked with said motor to power said motor; and switch means associated with said power supply and said motor for selectively powering said motor.

4. A powered zoom firearm scope according to claim 3, wherein when said scope is attached to said rifle mount and thereby to a firearm, said switch means is positioned to be operated by a user's hand while retaining a finger of said hand on the trigger of said rifle.

5. A powered zoom firearm scope according to claim 4, wherein said switch means is mounted at said eyepiece.

6. The powered zoom firearm scope of claim 4, wherein said motor emits a distinctive sound when said zooming gear reaches an end of its range.

7. A powered zoom firearm scope according to claim 5, wherein said power supply includes a plurality of batteries mounted in said housing.

8. A powered zoom rifle scope, comprising:

an elongate cylindrical body tube constituting a means for attachment to a rifle mount;

an eyepiece mounted at an ocular end of said body tube;

an objective lens mounted at an objective end of said body tube;

an erector lens mounted within said body tube and having crosshairs therein;

a zoom lens assembly mounted at said objective end, aligned with said body tube, and having a ring-like zooming gear proximate said objective lens;

a generally cylindrical housing mounted at said objective end, encasing said zoom lens assembly, and surrounding said tube to provide an annular space between said tube and said housing;

a miniaturized bidirectional motor mounted in said annular space and having its shaft aligned with the longitudinal axis of said tube and mechanically linked with said zooming gear;

a plurality of batteries mounted in said annular space and linked with said motor; and a switch mounted at said ocular end and linked with said batteries and said motor to selectively power said motor in either direction.

9. A powered zoom rifle scope according to claim 8, wherein when said scope is attached to said rifle mount and thereby to a firearm, said switch is positioned to be operated by a user's thumb while maintaining a shooting finger of the same hand on the trigger of said firearm.

10. The powered zoom rifle scope of claim 9, wherein said motor emits a distinctive sound when said zooming gear reaches an end of its range.

11. A power-zoom rifle scope according to claim 8, wherein optical properties of said eyepiece and said objective lens are coordinately selected to provide a fixed magnification.

12. A power-zoom rifle scope according to claim 8 wherein optical properties of said eyepiece and said objective lens are coordinately selected to be focused at infinity.

13. A power-zoom rifle scope according to claim 12 wherein said zoom lens assembly includes a focusing lens system.

14. A combination comprising:

a rifle;

a powered zoom firearm scope, said scope having:
 an elongate body tube mounted to said rifle,
 an eyepiece mounted at an ocular end of said body tube,
 an objective lens mounted at an objective end of said body tube,
 a generally cylindrical zoom lens assembly mounted at said objective end to be aligned with said body tube and having a zooming gear mounted proximate said objective lens system,
 a cylindrical housing mounted at said objective end surrounding said body tube and having a larger diameter than said body tube,
 a miniaturized motor mounted within said housing and mechanically linked with said zooming gear,
 a power supply mounted in said housing and linked with said motor to power said motor, and
 switch means associated with said power supply and said motor for selectively powering said motor, said switch means being positioned to be operated by a user's hand while retaining a finger of said hand on the trigger of said rifle.

15. The combination of claim 14, wherein said switch means is mounted at said eyepiece.

16. The combination of claim 15, wherein said power supply includes a plurality of batteries mounted in said housing.

17. A combination comprising:

a firearm;

a powered zoom rifle scope, said scope having:
 an elongate cylindrical body tube mounted to said rifle,
 an eyepiece mounted at an ocular end of said body tube,
 an objective lens mounted at an objective end of said body tube,
 a zoom lens assembly mounted at said objective end, aligned with said body tube, and having a ring-like zooming gear proximate said objective lens,
 a generally cylindrical housing mounted at said objective end, encasing said zoom lens assembly, and surrounding said body tube to provide an annular space between said tube and said housing,
 a miniaturized bidirectional motor mounted in said annular space housing, having its shaft aligned with the longitudinal axis of said body tube, and mechanically linked with said zooming gear,
 a plurality of batteries mounted in said annular space and linked with said motor, and
 a switch mounted at said ocular end and linked with said batteries and said motor to selectively power said motor in either direction, said switch being positioned to be operated by a user's thumb while maintaining a shooting finger of the same hand on the trigger of said firearm.

* * * * *